US007809618B2

(12) United States Patent
Velona

(10) Patent No.: US 7,809,618 B2
(45) Date of Patent: Oct. 5, 2010

(54) EDUCATIONAL TUITION SECURITIES SYSTEM

(76) Inventor: Diane Velona, 481 Brookside La., Hillsborough, NJ (US) 08844

( * ) Notice: Subject to any disclaimer, the term of this patent is extended or adjusted under 35 U.S.C. 154(b) by 861 days.

(21) Appl. No.: 10/951,434

(22) Filed: Sep. 28, 2004

(65) Prior Publication Data
US 2006/0074796 A1    Apr. 6, 2006

(51) Int. Cl.
    *G06Q 40/00*    (2006.01)
(52) U.S. Cl. .............................. 705/35; 705/36; 705/37; 705/38
(58) Field of Classification Search ....................... None
    See application file for complete search history.

(56) References Cited

U.S. PATENT DOCUMENTS

| 4,787,036 | A | | 11/1988 | Fleming ..................... 364/401 |
| 5,745,885 | A | * | 4/1998 | Mottola et al. ............. 705/36 R |
| 5,806,048 | A | | 9/1998 | Kiron et al. ..................... 705/36 |
| 5,809,484 | A | * | 9/1998 | Mottola et al. ............. 705/36 R |
| 6,424,952 | B1 | | 7/2002 | Yinbal ......................... 705/36 |
| 2002/0042767 | A1 | * | 4/2002 | Kwan ........................... 705/36 |
| 2003/0115124 | A1 | * | 6/2003 | Gonzalez .................... 705/36 |
| 2003/0163402 | A1 | | 8/2003 | Kincart ........................ 705/36 |
| 2004/0073480 | A1 | * | 4/2004 | Nahmias ...................... 705/14 |
| 2008/0235129 | A1 | | 9/2008 | Velona | |

OTHER PUBLICATIONS

Edwards, "Patent Backed Securitization: Blueprint for a New Asset Class." (11 pages).
Printout from CFO.com website (3 pages) http://www.cfo.com/Article?article=9621.
Printout from Education Week website (6 pages) http://www.edweek.org/ew/ewstory.cfm?slug=05prepaid.h22.
Printout from Financial-Planning.com website (2 pages) http://www.financial-planning.com/pubs/fp/20030401006.html.
Printout from the Motely Fool website (3 pages) http://www.fool.com/news/commentary/2004/commentary040526bm.htm?npu=y.
Printout from International Money Fund website (9 pages) http://www.imf.org/external/pubs/ft/fandd/2001/03/ketkar.htm.
Prinout from Investorwords.com website (6 pages) http://www.investorwords.com.
Printout from On Wall Street website (2 pages) http://www.onwallstreet.com/detail.cfm?page=/pubs/ows/19980401047.html.
Printout from Raymond James website (1 page) http://www.raymondjamesecm.com/ipo410_main.asp.
Printout from Registered Rep website (2 pages) http://www.registeredrep.com/mag/finance_whats_wrong_prepaid/.
Printout from Smartmoney.com website (4 pages) http://www.smartmoney.com/mag/index.cfm?story=august03-529.

(Continued)

*Primary Examiner*—Harish T Dass
*Assistant Examiner*—Benjamin S Fields
(74) *Attorney, Agent, or Firm*—McCarter & English, LLP

(57) ABSTRACT

An educational tuition securities system is provided. An educational institution can securitize tuition or course credits into tuition shares. Tuition shares in an educational institution can be purchased for a student and redeemed for payment of tuition credits or education costs at the educational institution. Tuition shares for an educational institution can be traded for tuition shares of another institution. Redeemed tuition shares can be used to pay for undergraduate and graduate education costs, or could be redeemed for cash. The invention provides a mechanism for paying future education costs, as well as for investing in educational institutions.

21 Claims, 4 Drawing Sheets

OTHER PUBLICATIONS

Printout from Trusts & Estates website (3 pages) http://www.trustsandestates.com/microsites/newsarticle.asp?mode=print&newsarticle=2671532&releaseid=&srid=11655&magazineid=150&siteid=16.

Prinout from USA Today website (4 pages) http://www.usatoday.com/money/wealth/saving/msw138.htm.

Illinois Student Assistance Commission, College Illinois! Asset/Liability Study (marked Jan. 31, 2003), available at http://www.collegezone.com/media/agenda01-03_Item10.pdf (2 pages).

Structured Finance, Universidad Diego Portales (identifying an "issue date" of May 9, 2003), available at www.ifc.org/ifcext/treasury.nsf/AttachmentsByTitle/SF_UDP/$FILE/UDP.pdf (2 pages).

International Finance Corporation, World Bank Group, Global Securitisation Review 2005-2006 (further discussing the Universidad Diego Portales identified in No. 2 above as being associated with an "issue date" of May 9, 2003), available at www.ifc.org/ifcext/treasury.nsf/attachmentsbytitle/sf_euromoney2005/$file/globalsecuritisationreview2005.pdf (8 pages).

Tuition Plan Consortium, Independent 529 Plan, www.independent529plan.org, e.g., "Independent 529 Plan Available to Public: A New Way to Pay for Private College at Less Than Today's Prices" available at http://www.independent529plan.org/news/story_090303.html (marked Sep. 3, 2003) and "How Independent 529 Plan Works" available at http://www.independent529plan.org/howitworks_main.html.

Savings for College Through College Tuition, available at http://www.jimreal.com/qtpfnprt.html (marked "Copyright (c) 2002").

* cited by examiner

EDUCATIONAL TUITION SECURITIES SYSTEM

BACKGROUND OF THE INVENTION

1. Field of the Invention

The present invention relates to an educational tuition securities system, wherein securities are issued by an educational institution, can be freely traded on an exchange, and can be redeemed for payment of fees at the educational institution.

2. Related Art

The ability to pay for the college education of a child is a significant concern for most parents. Tuition costs for college education continue to increase on a yearly basis at public and private institutions, including costs for room and board. In many instances, parents begin saving for a child's future college tuition when the child is at a young age.

Even though parents may be able to save money for a child's education, quite frequently, the amount saved is insufficient to pay for the entire cost of a child's college education. Further, funds for college education can be saved in low interest-bearing accounts (e.g., savings, certificate of deposit, money market accounts, etc.) that preserve principal, but do not yield a high rate of return. Other funds are invested in brokerage accounts (e.g. 529 plans and Coverdell Education Savings Accounts, of which Coverdell Accounts have a maximum contribution of $2,000 per year depending on annual income). Such accounts may consist of stocks, bonds, mutual funds, etc., which places assets at higher risk because principal can be lost and asset value is linked to economic market conditions that may not return desired investment results. State-sponsored pre-paid tuition plans represent another investment vehicle for paying education costs, but such plans are not offered by all states. Further, in some states, plans are limited to public educational institutions within a given state and require state residency. Pre-paid tuition gifts allow family members to purchase tuition at a current price to be used in the future, but if the child does not attend or withdraws from the institution the funds remain with the institution.

Often times, relatives wish to contribute to future education costs by giving gifts of money at special occasions, such as birthdays, etc. This money, however, is seldom reserved by the receiver exclusively for education costs. Rather, it is put into general funds and used as needed or desired.

Moreover, although student loans may provide sufficient capital to pay for the remainder (if not the entirety) of higher education costs, many students are left at graduation with significant debt. This can be particularly burdensome on a recent college graduate, especially if the graduate is not able to immediately find work and/or desires to enroll in graduate school. Thus, in today's education market, students are faced with increasing debt loads and parents are not provided with a means for affording higher education for their children without putting themselves or their children in debt.

Educational institutions are very highly esteemed by the public. The value of education is always increasing, and the cost of education is always rising. Despite the good will and ever-increasing value, there is no known mechanism for investing in educational institutions.

Accordingly, what would be desirable, but has not yet been provided, is an educational tuition securities system, wherein tuition shares can be purchased for investment or for others, freely traded on an exchange, and redeemed for payment of education fees at a desired educational institution.

SUMMARY OF THE INVENTION

The present invention provides an educational tuition securities system that allows for the trading of educational shares. An educational institution, such as a public or private college or university, can securitize tuition or course credits and issue tuition shares in the educational institution. The tuition shares could be sold in an initial public offering, using one or more underwriters and one or more brokers. Further, the institution could offer the tuition shares in any known manner or manner developed in the future, such as in a public or private auction including a Dutch auction or descending price auction. Investors could be comprised of parents, relatives, others that gift the tuition shares to a future or current student, future or current students themselves, as well as others interested in investing for profit. Tuition shares can be redeemed at the educational institution for tuition credit at the institution, or for cash if permitted by the educational institution. Further, tuition shares could be traded for tuition shares in another institution.

The present invention also provides a method for paying for tuition at an educational institution. The method comprises the steps of allowing an investor to purchase one or more tuition shares for a student; gifting the one or more tuition shares to the student; receiving the one or more tuition shares; and redeeming the one or more tuition shares to pay for tuition fees at the educational institution.

The present invention further provides a method of investing in educational institutions. The method comprises the steps of purchasing one or more tuition shares in an educational institution, the tuition shares redeemable for tuition credits at the institution; allowing the one or more tuition shares to appreciate with time; and selling or trading the tuition shares.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention provides an educational tuition securities system, wherein tuition shares can be issued by an educational institution and can be purchased by investors. By the term "tuition shares," it is meant shares that are issued by an educational institution and which can be purchased by investors. Further, by the term "tuition credit," it is meant the cost of education course credit at a university. "Education costs" include any and all costs associated with a student's education, including but not limited to, course credit, room-and-board, books, meals, supplies, or any other associated cost. A future or current student can redeem the tuition shares for tuition credit or payment of education costs. An investor could trade the tuition shares on an exchange. The tuition shares can be issued by one or more underwriters in an initial public offering. Further, the institution could offer the tuition shares in any known manner or manner developed in the future, such as in a public or private auction including a Dutch auction or descending price auction. Broker/dealers can establish brokerage accounts for individual investors. Shares for an educational institution can be traded for shares of another institution. Redeemed shares can be used to pay for tuition credits and/or education costs for undergraduate or graduate studies at an educational institution. Shares can be redeemed for tuition credits and/or education costs regardless of student status (e.g., part-time or full-time).

Figure 1:
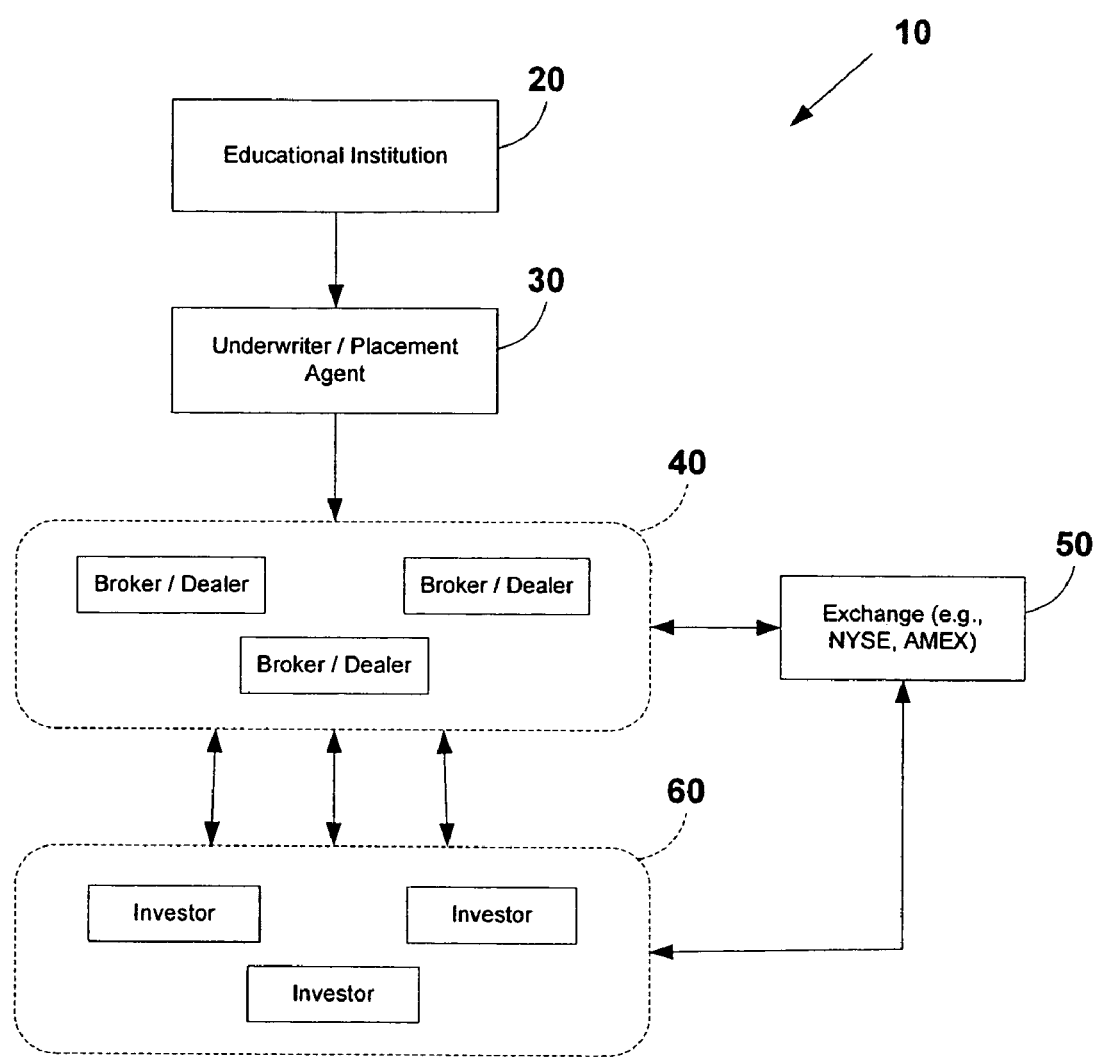
FIG. 1 is a diagram showing the educational tuition securities system of the present invention, wherein an initial public offering of tuition shares is made by an educational institution and sold to investors.

FIG. 1 is a diagram showing the educational tuition securities system of the present invention, indicated generally at 10, wherein an initial public offering of tuition shares is made by an educational institution and sold to investors. By the term "investors," it is meant parents, relatives, and others that gift the tuition shares to a future or current student, future or current students themselves, as well as others interested in investing for profit. An educational institution 20, such as a public or a private college or university, can issue a fixed number of tuition shares in the institution. An institution's tuition shares can be freely traded on an exchange. The tuition shares could have an established face value, which could be all or a fraction of the cost of a tuition credit or complete tuition at the educational institution. The tuition share prices can fluctuate based upon market demand. An underwriter or placement agent 30 could be utilized to issue shares in an initial public offering. The institution 20 can participate in a single initial public offering and then cease issuing future tuition shares, or could issue additional tuition shares in the future. The underwriter 30 coordinates with a plurality of broker/dealers 40 to issue the tuition shares to the public.

The underwriter 30 could comprise any desired broker/dealers that are licensed to trade securities on a public market, or a separate class of broker/dealers can be utilized. One or more investors 60 can purchase tuition shares directly from the broker/dealers 40 prior to the initial public offering and shares can be transferred to the investor's account on the launch date. On the launch date, unsold shares could be purchased by the investors 60 over an exchange 50, such as an existing exchange (e.g., the New York Stock Exchange (NYSE) or American Stock Exchange (AMEX)), or a newly-created exchange. A standard brokerage account could be established by the broker/dealers 40 for each investor 60, and the purchased tuition shares allocated to each account. Moreover, a number of tuition shares corresponding to a plurality of educational institutions could be purchased and allocated to a brokerage account, thereby providing investors with a portfolio of educational investments. Additionally, the tuition shares could correspond to both public and private institutions.

Figure 2:
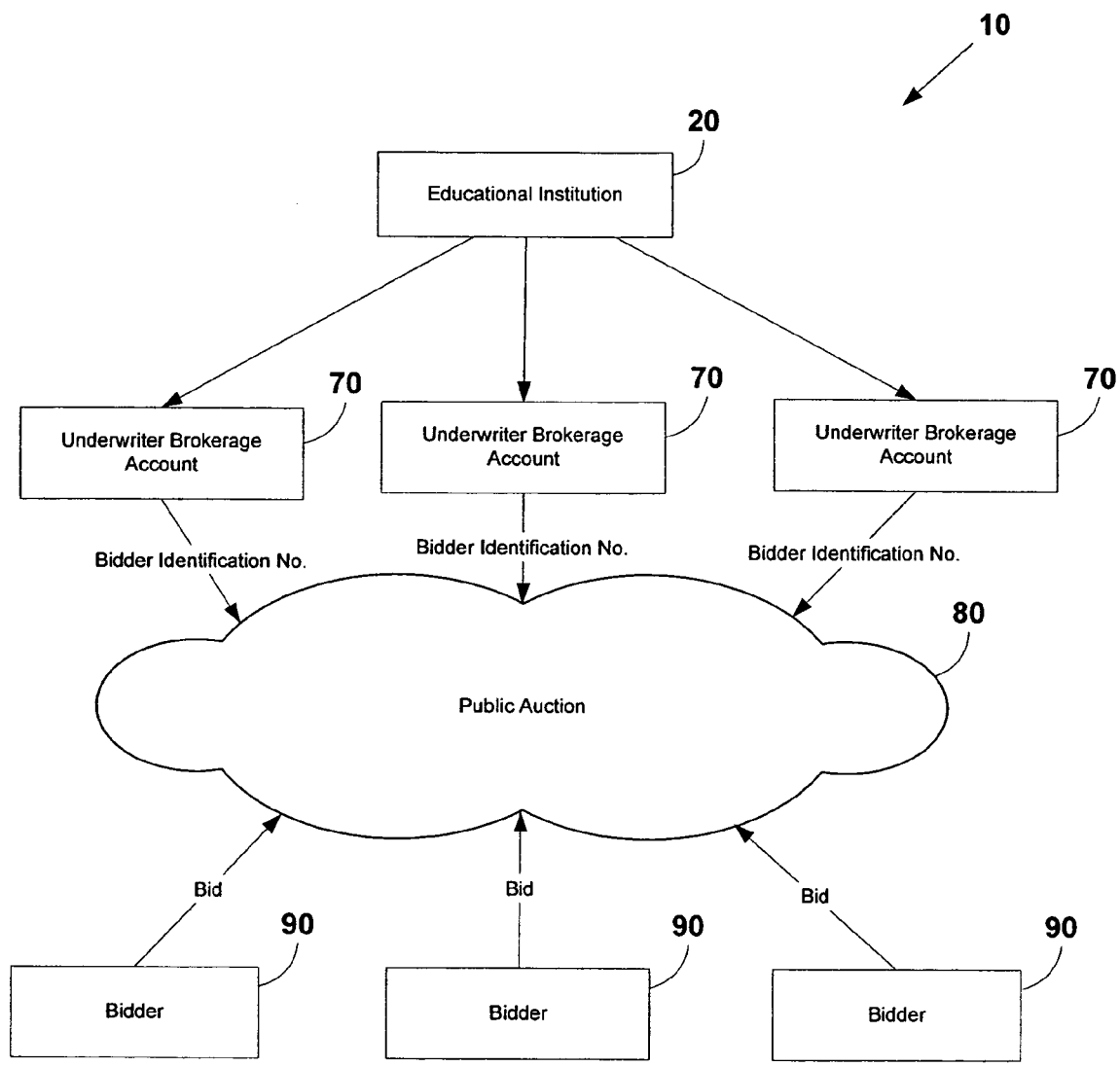
FIG. 2 is a diagram showing the educational tuition securities system of the present invention, wherein a public auction is conducted to sell tuition shares on the open market.

FIG. 2 is a diagram showing the educational tuition securities system 10 of the present invention, wherein a public auction is conducted to sell tuition shares on an open market. The educational institution 20 can conduct a public auction to sell tuition shares. The auction could be any desired form of auction, such as a Dutch auction or descending price auction. The educational institution 20 issues tuition shares to one or more authorized underwriters, each of which establishes a brokerage account 70. One or more bidders 90 can participate in the auction 80 by opening an account with the one or more authorized underwriters and obtaining a bidder identification number. The bidders could comprise investors or broker/dealers. The bidder identification numbers are only issued to the bidders 90 prior to the opening of the auction 80. When the auction 80 is opened, no bidder identification numbers are issued, and each of the bidders submits a bid. When the auction closes, shares are traded to the winning bidders. Each bidder can then notify the broker/dealer with whom the bidder's account is located, so that additional shares can be purchased or sold via an exchange to other investors, as discussed earlier with respect to FIG. 1.

In the case of a Dutch auction (similar to the auction conducted for Google, Inc.'s initial public offering), no placement agent is required. Each bidder submits a bid that includes the number of shares bid and a desired price per share. The bids are concealed from each bidder. Once the auction has closed, the shares are allocated to each bidder based upon the number of shares identified in each respective bidder's bid. The lowest bid price in the auction is then identified. Each bidder that submitted a bid higher than the lowest bid price is granted the shares allocated to the bidder. However, rather than paying the price identified in the bidder's bid, the bidder pays a share price that is equal to the lowest bid. It should be noted that the auction need not be limited to a public auction, and that a private auction could be conducted. The initial public offering of Google, Inc. is an example of a Dutch auction.

Figure 3:
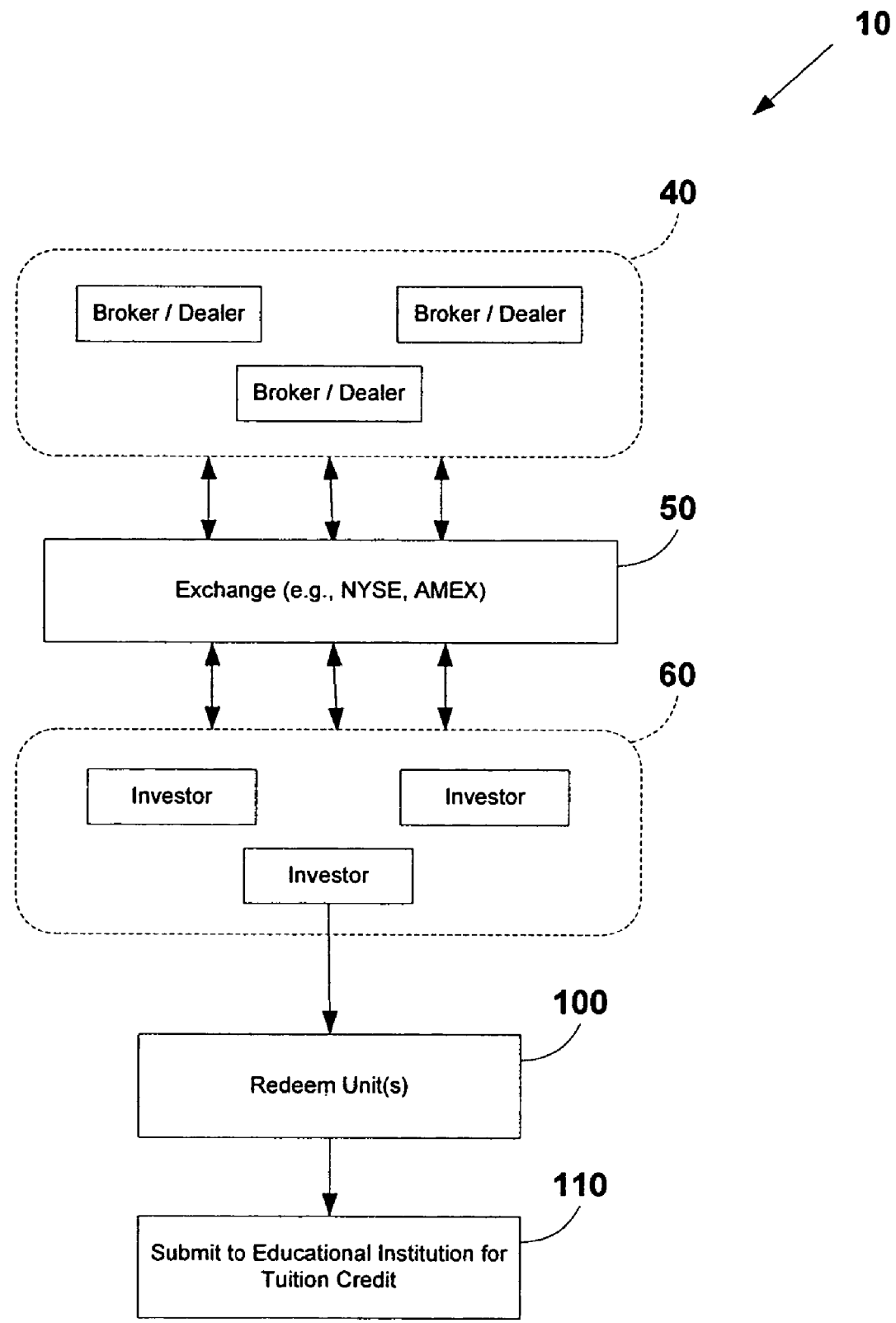
FIG. 3 is a diagram showing the educational tuition securities system of the present invention, wherein the tuition shares are traded on an exchange and can be redeemed for payment at a desired educational institution.

FIG. 3 is a diagram showing the educational tuition securities system 10 of the present invention, wherein educational securities are traded on an exchange and can be redeemed for payment at a desired educational institution. The investors 60 can actively trade shares over the exchange 50. For example, an investor can purchase and sell any desired number of shares in one or more educational institutions, and can trade such shares for shares in additional or other participating institutions. Further, the investor can gift the shares to a future or current student, or redeem the shares for tuition credit at the educational institution. Additionally, the shares could be redeemed for cash through the educational institution (if authorized by the educational institution), or through selling the shares on the exchange.

As shown in block 100, one or more tuition shares can be redeemed and then submitted to an educational institution in block 110 for tuition credit and/or payment of education costs. For example, if a student has recently been admitted to a college and must begin making tuition payments, in block 100, the student can redeem a desired number of tuition shares from his or her brokerage account. Then, in block 110, the redeemed tuition shares can be submitted to the educational institution to pay tuition costs and/or education costs. Each tuition share could correspond to one or a fraction of a tuition credit, according to a fixed or fluctuating conversion rate determined by the educational institution. For example, a single tuition share at a given institution could correspond to one quarter of a tuition credit of coursework at the institution. Alternatively, the shares could be redeemed for cash (if permitted by the institution), and used to pay for tuition credit and/or education costs at the institution, such as books, room and board, etc. Moreover, if an educational institution conducts another issuance of tuition shares, such tuition shares could have a different conversion rate. Further, a student can trade shares in one institution for tuition shares in another institution that the student is attending.

Figure 4:
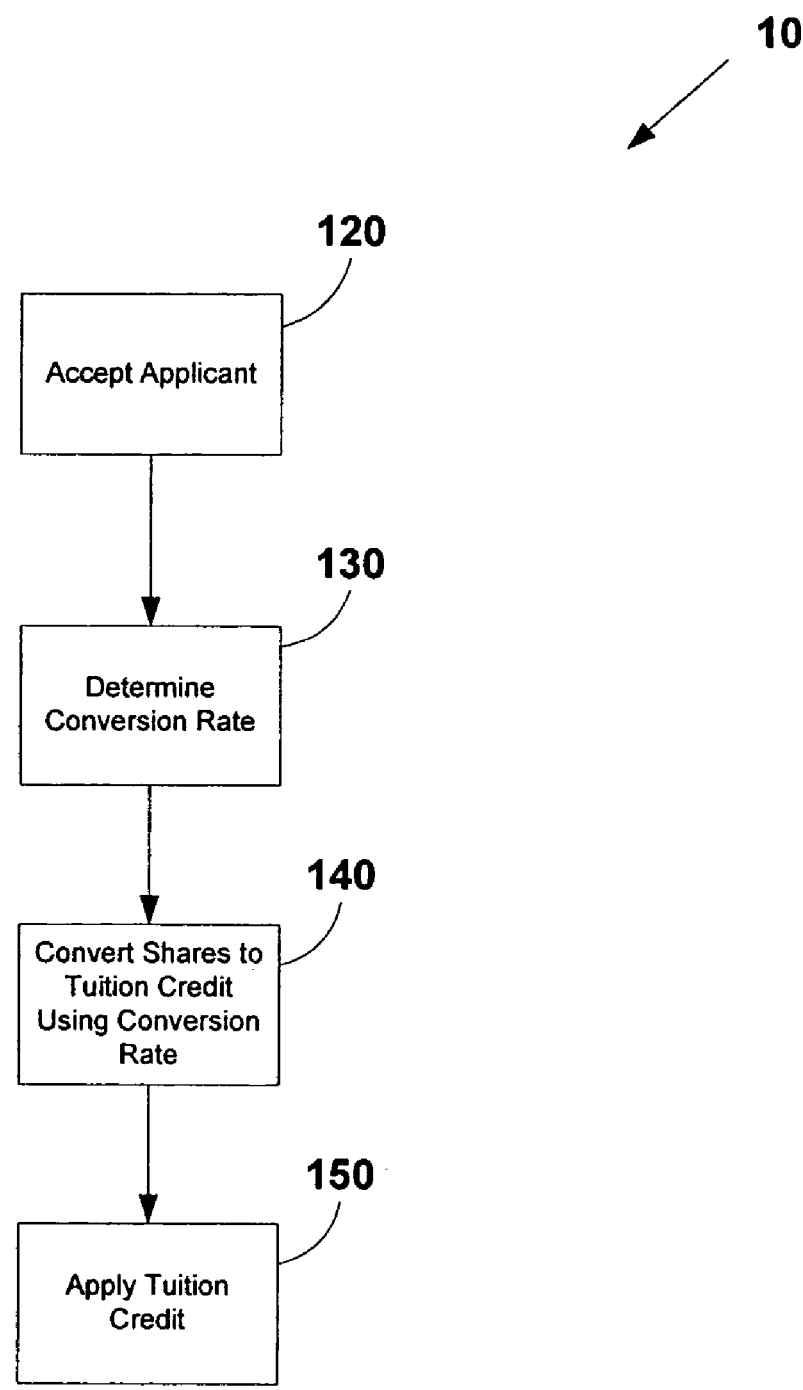
FIG. 4 is a flowchart showing the application process of the educational tuition securities system of the present invention in greater detail.

FIG. 4 is a flowchart showing the application process of the educational tuition securities system 10 of the present invention in greater detail. As mentioned earlier, an owner of tuition shares in an educational institution can redeem any desired number of shares, and use same to pay for tuition credits and/or education costs. In step 120, an applicant's request to redeem a given number of tuition shares for tuition credit and/or payment of education costs is accepted at the educational institution. Then, in step 130, a share-to-credit conversion rate is determined by the institution, so that the shares can be exchanged for tuition credit. The conversion rate can be any desired rate and can be set by the educational institution, typically upon issuance of the tuition shares. For example, at the time of an initial public offering, the educational institution could determine that one tuition share is equivalent to one quarter of a tuition credit. Regardless of economic conditions that could cause price fluctuations, the full one quarter tuition credit can be redeemed at the institution. In step 140, the shares are converted to tuition credit using the conversion rate. In step 150, the student is granted the tuition credits. The tuition credits could be used to pay for coursework, or converted to cash to pay for education costs such as books or room-and-board, etc.

It should be noted that the present invention can be applied for use in both undergraduate and graduate studies, at public and private universities. For example, a parent or relative of a student could purchase a number of tuition shares in a desired undergraduate institution, as well as a number of tuition shares in a desired graduate institution. The shares could be redeemed regardless of a student's status (e.g., part-time or full-time).

Additionally, the tuition shares could provide an investment mechanism that can be used by investor for profit. Similar to shares in corporations, tuition shares in the educational institution can be purchased and actively traded with tuition shares of other institutions for profit. Further, tuition shares can be purchased and held for a period of time, such as a number of years, and then redeemed or sold for cash at a later date. The shares can appreciate with time, thereby providing an investment for the holder and allowing a purchaser to buy future tuition at a lower price.

Some additional advantages of the present invention include, but are not limited to: (a) the ability to generate future cash flows for educational institutions in the present, whereby the educational institution can invest funds to generate income in the present and for future income (similar to how insurance companies manage funds for insurance policy payouts); (b) the ability to limit the number of shares that are redeemed per semester to avoid possible cash flow issues; (c) the use of funds to improve campuses, dormitories, and other facilities; (d) the ability of an educational institution to control the use of tuition shares (e.g., for tuition credit, books, room-and-board, meal plans, and other related fees); (e) the ability to control conversion rates between tuition shares and tuition credits; (f) the ability of investors to purchase tuition shares of one or more educational institutions; (g) the flexibility to sell tuition shares of one educational institution (possibly for profit) if a student does not attend that educational institution; (h) the ability to purchase tuition shares at a discount if shares are trading below initial offering prices; and (i) the use of tuition shares by full- or part-time students.

Having thus described the invention in detail, it is to be understood that the foregoing description is not intended to limit the spirit and scope thereof. What is desired to be protected by Letters Patent is set forth in the appended claims.

What is claimed is:

1. A method for transacting in educational tuition securities comprising: receiving the securities in the form of tuition shares associated with a conversion rate for tuition credit for an educational institution; trading at least a portion of the tuition shares on an exchange for other securities in the form of other tuition shares associated with another conversion rate for tuition credit for another educational institution; and redeeming the other tuition shares with the another educational institution in accordance with the another conversion rate for the tuition credit for the another educational institution; wherein the conversion rate between the tuition shares and the tuition credit for the educational institution is fixed over time regardless of fluctuation in the price of tuition credits for the educational institution, and wherein the another conversion rate for the tuition credit for the another educational institution is fixed over time regardless of fluctuation in the price of tuition credits for the another educational institution.

2. The method of claim 1, wherein the conversion rate is a tuition share-to-tuition credit conversion rate for the educational institution, and wherein the another conversion rate is another tuition share-to-tuition credit conversion rate for the another educational institution.

3. The method of claim 1, wherein at least one of the conversion rate and the another conversion rate has a tuition share-to-tuition credit ratio that is constant over time.

4. The method of claim 1, wherein at least one of the conversion rate and the another conversion rate includes a fluctuation over time that is predetermined.

5. The method of claim 1, wherein the exchange comprises at least one of the American Stock Exchange and the New York Stock Exchange.

6. The method of claim 1, further comprising redeeming a portion of the tuition shares for cash.

7. The method of claim 1, wherein the step of receiving the securities comprises buying the securities.

8. The method of claim 1, wherein the step of receiving the securities comprises receiving a gift of the securities.

9. The method of claim 1, wherein the step of receiving the securities comprises engaging an initial public offering of the securities of the educational institution to buy the securities.

10. A method for transacting in educational tuition securities comprising: buying, by bidding in an auction, the securities in the form of tuition shares associated with a conversion rate for tuition credit for an educational institution; trading at least a portion of the tuition shares on an exchange for other securities in the form of other tuition shares associated with another conversion rate for tuition credit for another educational institution; and redeeming the other tuition shares with the another educational institution in accordance with the another conversion rate for the tuition credit for the another educational institution; wherein the conversion rate between the tuition shares and the tuition credit for the educational institution is fixed over time regardless of fluctuation in the price of tuition credits for the educational institution, and wherein the another conversion rate for the tuition credit for the another educational institution is fixed over time regardless of fluctuation in the price of tuition credits for the another educational institution.

11. The method of claim 10, wherein the exchange comprises at least one of the American Stock Exchange and the New York Stock Exchange.

12. The method of claim 10, wherein the conversion rate is a tuition share-to-tuition credit conversion rate for the educational institution, and wherein the another conversion rate is another tuition share-to-tuition credit conversion rate for the another educational institution.

13. The method of claim 10, wherein at least one of the conversion rate and the another conversion rate has a tuition share-to-tuition credit ratio that is constant over time.

14. The method of claim 10, wherein at least one of the conversion rate and the another conversion rate includes a fluctuation over time that is predetermined.

15. The method of claim 10, further comprising redeeming a portion of the tuition shares for cash.

16. The method of claim 10, wherein the auction comprises a Dutch auction.

17. The method of claim 10, wherein the auction comprises a descending price auction.

18. A method for transacting in educational tuition securities comprising: utilizing an exchange to buy in an auction securities in the form of tuition shares associated with a conversion rate for tuition credit for an educational institution; and redeeming the tuition shares in accordance with the conversion rate for the tuition credit for the educational institution, wherein the conversion rate between the tuition shares and the tuition credit for the educational institution is fixed over time regardless of fluctuation in the price of tuition credits for the educational institution.

19. A method for transacting in educational tuition securities comprising: utilizing an exchange to sell in an auction securities in the form of tuition shares associated with a conversion rate for tuition credit for an educational institution; and redeeming the tuition shares in accordance with the conversion rate for the tuition credit for the educational institution, wherein the conversion rate between the tuition shares and the tuition credit for the educational institution is fixed over time regardless of fluctuation in the price of tuition credits for the educational institution.

20. A method for transacting in educational tuition securities comprising: utilizing an exchange to buy securities in the form of tuition shares associated with a conversion rate for tuition credit for an educational institution; and redeeming the tuition shares in accordance with the conversion rate for the tuition credit for the educational institution, wherein the conversion rate between the tuition shares and the tuition credit for the educational institution is fixed over time regardless of fluctuation in the price of tuition credits for the educational institution.

21. A method for transacting in educational tuition securities comprising: utilizing an exchange to sell securities in the form of tuition shares associated with a conversion rate for tuition credit for an educational institution; and redeeming the tuition shares in accordance with the conversion rate for the tuition credit for the educational institution, wherein the conversion rate between the tuition shares and the tuition credit for the educational institution is fixed over time regardless of fluctuation in the price of tuition credits for the educational institution.

* * * * *